Feb. 12, 1963 D. L. NELSON 3,077,238
SNOW VEHICLE
Filed Oct. 11, 1961 4 Sheets-Sheet 1

David L. Nelson
INVENTOR.

Feb. 12, 1963  D. L. NELSON  3,077,238
SNOW VEHICLE
Filed Oct. 11, 1961  4 Sheets-Sheet 2

David L. Nelson
INVENTOR.

BY *Clarence A. O'Brien*
*and Harvey B. Jacobson*
Attorneys

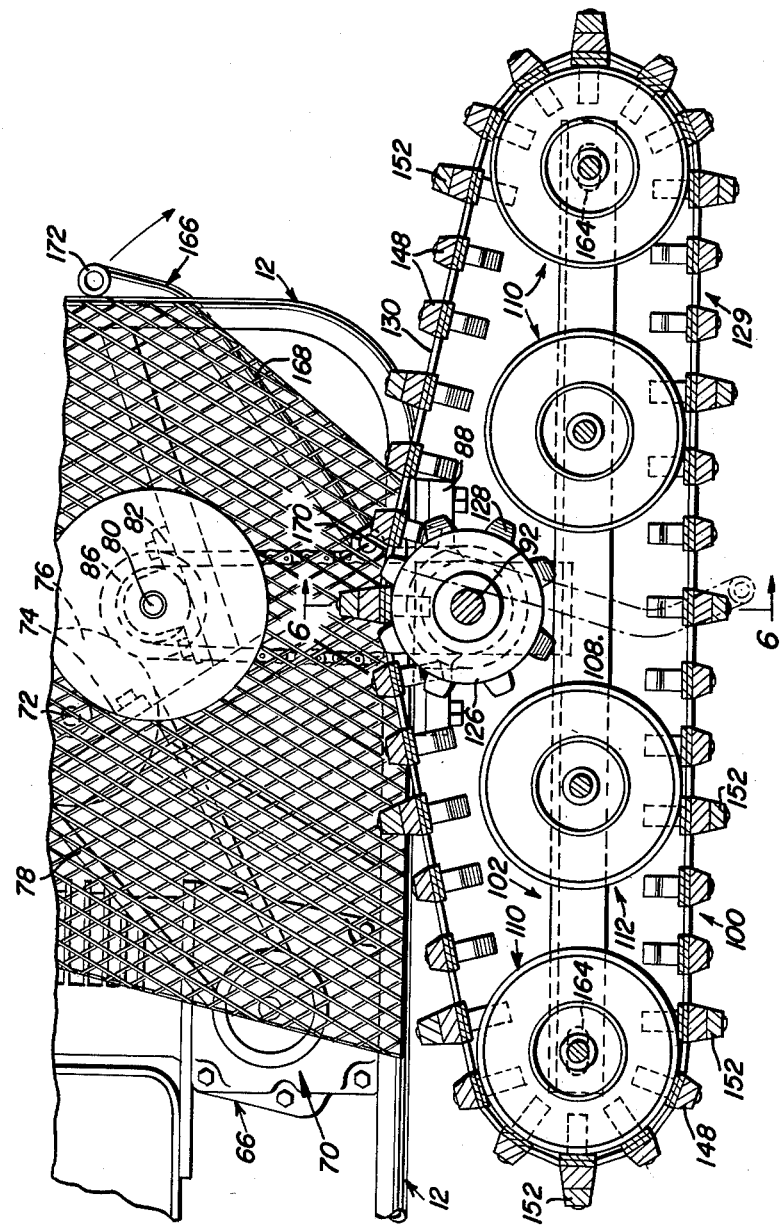

Feb. 12, 1963     D. L. NELSON     3,077,238
SNOW VEHICLE
Filed Oct. 11, 1961                                                          4 Sheets-Sheet 4
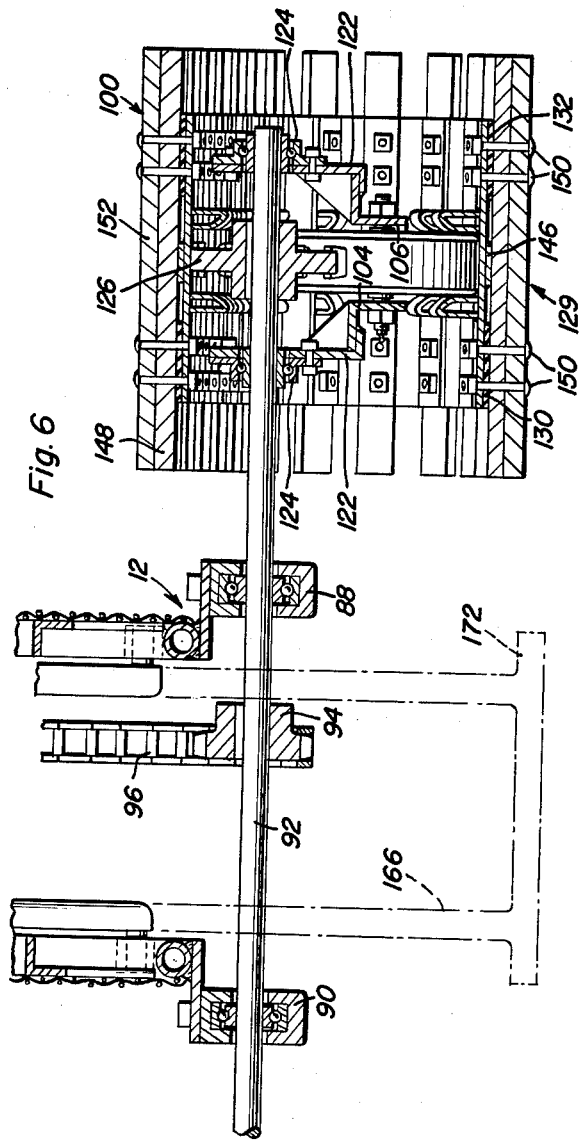
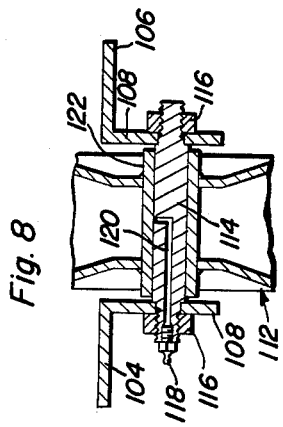
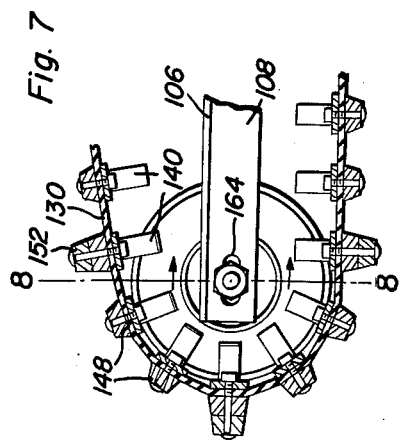
David L. Nelson
INVENTOR.

United States Patent Office 3,077,238
Patented Feb. 12, 1963

3,077,238
SNOW VEHICLE
David L. Nelson, Soda Springs, Idaho
Filed Oct. 11, 1961, Ser. No. 144,374
6 Claims. (Cl. 180—5)

This invention relates to a novel and useful snow vehicle.

While the snow vehicle of the instant invention has been specifically adapted for travel over snow, it is to be understood and will probably become hereinafter apparent that the snow vehicle is also particularly well adapted to travel over any type of soft but fairly firm supporting surface such as sand, marsh land and mud.

The snow vehicle of the instant invention includes a main frame provided with front support means in the form of a runner assembly which is mounted for movement about an upstanding axis and provided with handlebar steering means in order that the runner assembly may be utilized to steer the snow vehicle. The rear end of the frame of the snow vehicle is supported by means of a pair of laterally spaced and longitudinally extending endless track assemblies and each endless track assembly is pivotally mounted to the main frame for movement extending transversely of the main frame and the corresponding endless track assembly. The endless track assemblies are mounted for rotation about coinciding axes and for pivotal swinging movement independently of each other. In this manner the snow vehicle of the instant invention is particularly well adapted to travel over rough terrain and it is of course also to be understood that the snow vehicle is fully capable of traveling over firm terrain as well as soft terrain.

The main object of this invention is to provide a snow vehicle capable of traveling over all types of snow with the possible exception of an extremely deep and light snow.

Another object of this invention is to provide a snow vehicle which may be readily transported from one area to another for which purpose the snow vehicle is of light yet rigid construction.

Still another object of this invention is to provide a snow vehicle in accordance with the preceding objects having sufficient power to climb steep snow covered slopes and to pull a supply sled or the like if desired.

Another object of this invention is to provide a snow vehicle having endless crawler-type tread assemblies constructed in a manner whereby the drive assembly for the crawler-type tread assemblies will also function to maintain the tread assemblies free of packed snow in the area of the tread assemblies engaged by idler wheels.

A final object of this invention to be specifically enumerated herein is to provide a snow vehicle which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a fragmentary enlarged vertical sectional view taken upon a plane passing through the longitudinal centerline of one of the crawler-type tread assemblies;

FIGURE 6 is a fragmentary enlarged vertical sectional view taken substantially upon the plane indicated by the section line 6—6 of FIGURE 5;

FIGURE 7 is an enlarged fragmentary vertical sectional view showing the manner in which the idler wheels may be adjusted to maintain proper tensioning of the endless flexible members of the crawler-type tread assemblies;

FIGURE 8 is a fragmentary enlarged transverse vertical sectional view taken substantially upon the plane indicated by the section line 8—8 of FIGURE 7.

Figure 1:
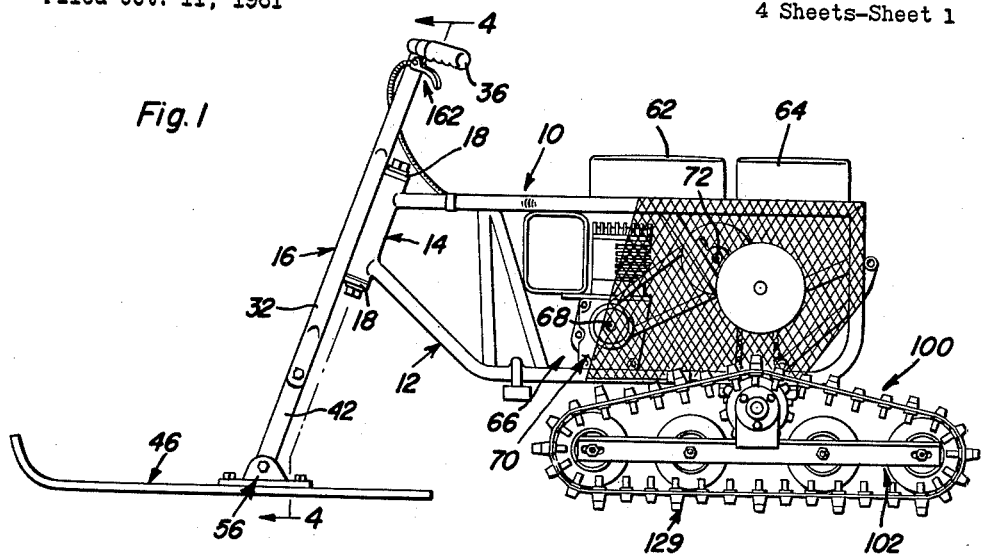
FIGURE 1 is a side elevational view of the snow vehicle.

Referring now more specifically to the drawings the numeral 10 generally designates the snow vehicle of the instant invention. The snow vehicle 10 includes a main frame generally referred to by the reference numeral 12 which has a forwardly and downwardly inclined journal portion generally referred to by the reference numeral 14 disposed at its forward end. A front fork assembly generally referred to by the reference numeral 16 is supported by means of the journal portion 14 and includes a pair of apertured mounting ears 18 through which the shank portion 20 of a pivot bolt generally referred to by the reference numeral 22 is secured. The pivot bolt 22 includes a diametrically enlarged head portion 24 and the end of the shank 20 remote from the head portion 24 is secured through the lowermost apertured mounting ear 18 by means of a threaded nut 26 threadedly engaged with the lower end of the shank portion 20. The apertured ears 18 comprise a part of transverse brace members 28 which are secured between a pair of upright standards 30 and 32 of the front fork assembly 16. A handlebar assembly generally referred to by the reference numeral 34 and including handgrips 36 and 38 is secured to the upper ends of the standards 30 and 32. The lower end of the front fork assembly 16 includes a pair of laterally spaced standard extensions 40 and 42 which comprise extensions of the standards 30 and 32 respectively and are suitably braced by means of brace members 44.

A runner assembly generally referred to by the reference numeral 46 includes a mounting plate 48 which is secured to a runner member 50 in any convenient manner such as by fasteners 52. The mounting plate 48 includes a pair of bifurcated mounts generally referred to by the reference numerals 54 and 56 to which the lower ends of the extensions 40 and 42 are pivotally secured by means of pivot bolts 58 and 60 respectively. Thus, the runner assembly 46 is pivotally mounted to the lower end of the front fork assembly 16 for movement about a horizontally disposed axis extending between the extensions 40 and 42.

The main frame 12 is provided with a pair of seats 62 and 64 which may accommodate one or more persons and an internal combustion engine generally referred to by the reference numeral 66 is mounted on the main frame 12 and includes an output shaft 68 on which there is mounted a centrifugal clutch pulley assembly generally referred to by the reference numeral 70.

An intermediate shaft 72 is journalled for rotation about a transverse axis by means of journal blocks 74 and one end of the shaft 72 has a pulley wheel 76 secured thereto which is alined with the centrifugal clutch pulley assembly 70 and is operatively connected thereto by means of endless flexible belt 78.

A second intermediate shaft 80 is also rotatably journalled on the main frame 12 by means of a pair of journal blocks 82 and is drivingly connected to the intermediate shaft 72 by means of a pair of alined pulleys secured to the shafts 72 and 80 and having an endless flexible chain 84 entrained thereover. A drive sprocket wheel 86 is also mounted on the second intermediate shaft 80 and the main frame 12 also includes a pair of journal blocks 88 and 90 which rotatably journal a drive shaft 92 having a driven gear wheel 94 mounted thereon alined with the drive gear wheel 86. The drive gear wheel 86 is drivingly connected to the driven gear wheel 94 by means of an endless chain 96.

Figure 2:
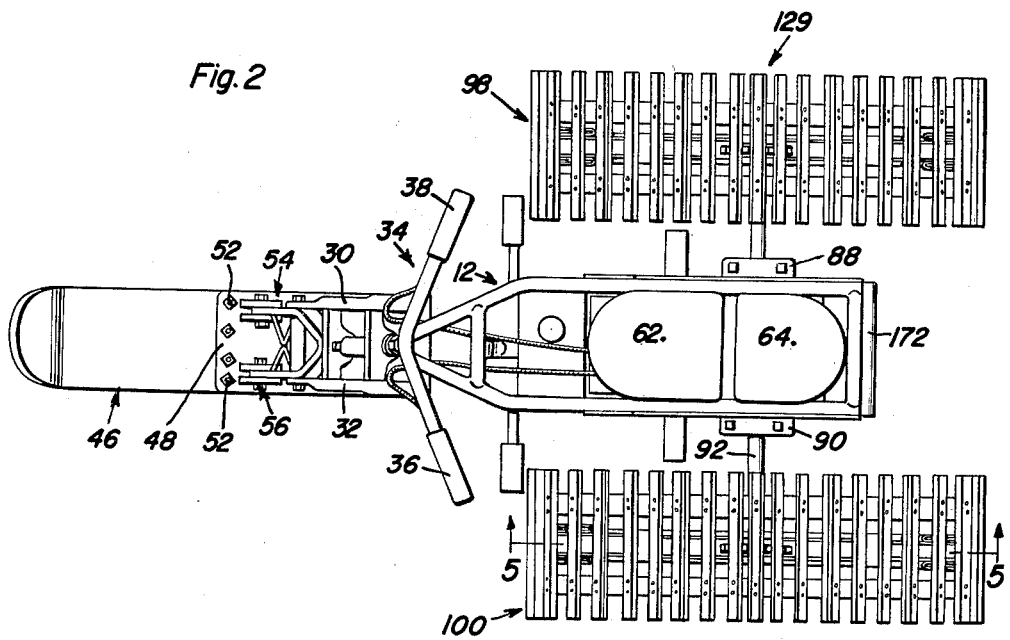
FIGURE 2 is a top plan view of the embodiment illustrated in FIGURE 1.
Figure 3:
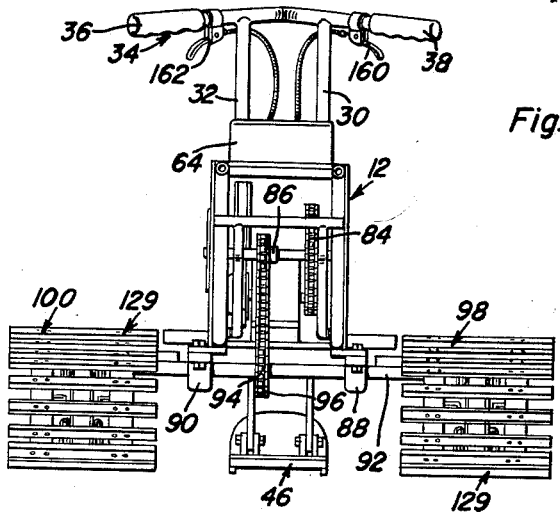
FIGURE 3 is a rear elevational view of the snow vehicle.
Figure 4:
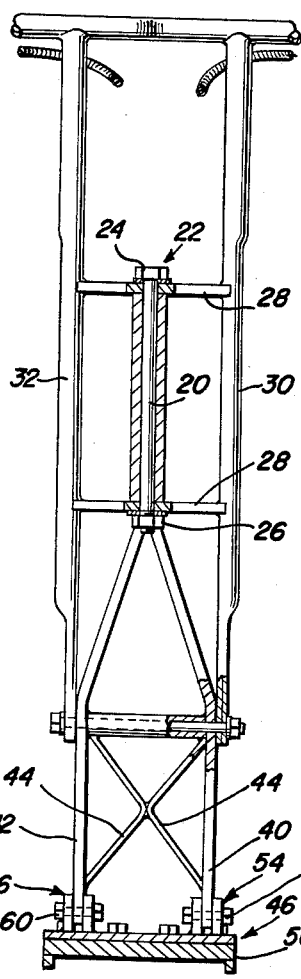
FIGURE 4 is a fragmentary enlarged elevational view of the front fork assembly of the snow vehicle with parts thereof being broken away and shown in section.

It will be noted from FIGURE 2 of the drawings that the snow vehicle 10 includes a pair of laterally spaced endless track assemblies generally referred to by the reference numerals 98 and 100 and from FIGURES 5 and 6 of the drawings it will be noted that the endless track assembly 100 includes an elongated support member generally referred to by the reference numeral 102. Each elongated support member 102 includes a pair of L-shaped members 104 and 106 which each include a depending flange 108. The depending flanges 108 are substantially parallel and a plurality of idler wheel assemblies generally referred to by the reference numerals 110 are mounted between corresponding flanges 108 and each includes a resilient wheel generally referred to by the reference numeral 112 which is journaled on an axle member 114, see FIGURE 8, secured between the corresponding flanges 108 by means of threaded fasteners 116. Each axle member 114 includes a grease fitting 118 and a grease passage 120 communicating the corresponding grease fitting with the mid-portion of the journal portion 122 of the wheel 112.

Each of the L-shaped members 104 and 106 includes a standard 122 and each standard 122 includes a bearing journal 124 which rotatably receives the corresponding end of the drive shaft 92. It will be noted that the bearing journals 124 of each endless track assembly rotatably receive the drive shaft 92 at points spaced longitudinally there along.

From FIGURES 5 and 6 of the drawings it will also be noted that a drive wheel 126 and including a plurality of radially extending and circumferentially spaced teeth 128 is secured to the drive shaft 92 between each pair of bearing journals 124.

The endless track member 129 of each endless track assembly includes a pair of laterally spaced and longitudinally extending endless flexible members 130 and 132 which are interconnected by means of transverse brace members generally referred to by the reference numeral 134.

Figure 9:
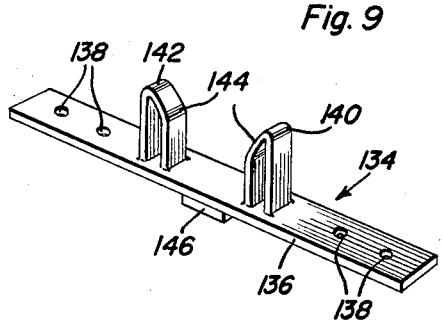
FIGURE 9 is a perspective view of one of the transverse brace members of the endless flexible members comprising a part of one of the crawler-type tread assemblies.

The transverse brace members as can best be seen in FIGURE 9 of the drawings each include an elongated and substantially flat bar 136 suitably apertured at opposite ends by means of a pair of apertures 138 and provided with longitudinally spaced and inwardly directed generally inverted U-shaped guide members 140 and 142. It will be noted that the free ends of corresponding guide members 140 and 142 are beveled as at 144. Additionally, each bar 136 includes a spacing lug 146 which projects from its mid-portion to the side of the bar remote from the guide members 140 and 142.

Accompanying each brace member 134 and comprising a part thereof is a transverse traction member 148 which has substantially the same plan outline as the corresponding bar 136 and is also similarly apertured. From FIGURES 5 and 6 of the drawings it may be seen that the bars 136 and traction members 148 are secured to the inner and outer surfaces of the endless flexible members 130 and 132 by means of pairs of fasteners 150 secured through the apertures 138 and the corresponding apertures formed in the traction members 148. It will be noted that the spacing lug 146 is substantially the same thickness as the endless flexible members 130 and 132.

If it is desired, certain ones of the transverse brace members 134 may be provided with additional supplemental traction members 152, see FIGURE 5.

It will be noted that the endless track members 128 are entrained about the corresponding idler wheels 110 and that the resilient wheels or tires 112 are received between the guide members 140 and 142. Additionally, it will be noted that the drive wheel 126 of each endless track assembly engages the bars 136 of that track assembly between the corresponding guide members 140 and 142 whereupon the teeth 128 and their engagement with the bars 136 will assure that the bars 136 will be cleaned of accumulated snow each revolution of the endless track member. In this manner, snow will not accumulate in the area of the endless track members 128 which are engaged by the idler wheel assemblies 110.

It will be noted that the axis of rotation of the drive shaft 92 is spaced laterally from a straight line passing between the axes of rotation of corresponding idler wheel assemblies 110 and that the drive wheel 126 laterally and outwardly deflects the corresponding endless flexible member 128.

The handlebar assembly 134 may be provided with suitable throttle controls 160 for the internal combustion engine 66 and a control 162 for manually operating the centrifugal clutch pulley assembly 70 or for any suitable braking mechanism provided.

It will be noted that the endmost idler wheel assemblies 110 are adjustable longitudinally of the corresponding flanges 108 by means of the longitudinally extending slots 164 formed therein along which the corresponding axle members 114 may be adjusted.

A retractable and generally U-shaped kick stand assembly referred to in general by the reference numeral 166 is pivotally mounted to the frame 12 at the free ends of the arms 168 of the kick stand as at 170 for movement of the bight portion 172 of the kick stand 166 through an arc between the position illustrated in FIGURE 5 of the drawings in solid lines and the position illustrated in phantom lines in FIGURE 5.

In this manner, the rear ends of the main frame 12 and the endless track assemblies 98 and 100 may be elevated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A snow vehicle comprising a main frame having front support means adapted to ride over snow and support the forward end of said main frame, rear support and driving means comprising a pair of laterally spaced endless track assemblies each including an endless track member, means rotatably mounting said assemblies on said frame for rotation about axes extending transversely of said frame and mid-portions of said assemblies, a drive wheel for each of said assemblies rotatably mounted for rotation about an axis coinciding with the axis of rotation of the corresponding assembly and drivingly engaged with corresponding endless track members, said means mounting said assemblies on said frame comprising a drive shaft whose opposite ends project outwardly from opposite sides of said frame, said drive wheels being mounted on the projecting portions of said drive shaft, said assemblies each including an elongated support member journaled on said shaft and extending transversely thereof, a pair of aligned idler wheels rotatably mounted on each of said support members for rotation about axes spaced longitudinally thereof and extending transversely thereof, said endless track members being entrained over said idler wheels of corresponding assemblies with the associated drive wheel drivingly engaged therewith, each of said elongated support members including a pair of generally parallel longitudinal members each having a pair of bearing journals rotatably journaling the corresponding end portion of said shaft on opposite sides of the corresponding drive wheel, the idler wheels of each assembly being journaled on an axle member secured between corresponding portions of the associated longitudinal members, each of said endless track members including a pair of laterally spaced and longitudinally extending endless flexible members interconnected by means of a plurality of transversely extending and longitudinally spaced brace members, said drive wheels each including a plurality of radially extending circumferentially spaced teeth drivingly engageable with at least some of the brace members of the corresponding endless track member, each of said drive wheels being aligned with the corresponding idler wheels and at least some of said brace members of each endless track member including guide members disposed on opposite sides of the path of movement of the corresponding idler wheels about said endless track member and projecting inwardly of said track member and defining opposite side marginal limits for said path of movement of said idler wheels and abutment surfaces for engagement with opposite sides of said idler wheels in order to keep said idler wheels centered relative to said path of movement.

2. For use with a vehicle having a frame, a drive shaft adapted to be rotatably supported from said frame, a drive wheel mounted on said drive shaft for rotation therewith, an elongated support member journaled on said shaft and extending transversely thereof, a pair of alined idler wheels rotatably mounted on said support member for rotation about axes spaced longitudinally of said support member and extending transversely thereof, an endless track member entrained over said idler wheels with said drive wheel drivingly engaged therewith, said elongated support member including a pair of generally parallel longitudinal members having a pair of bearing journals rotatably journaling said shaft on opposite sides of said drive wheel, said idler wheels each being journaled on the portions of the corresponding axle member secured between corresponding portions of said longitudinal members, said endless track member including a pair of laterally spaced and longitudinally extending endless flexible members interconnected by means of a plurality of transversely extending and longitudinally spaced brace members, said drive wheel including a plurality of radially extending circumferentially spaced teeth drivingly engaged with at least some of said brace members, said drive wheel being aligned with said idler wheels and at least some of said brace members including guide members disposed on opposite sides of the path of movement of said idler wheels about said endless track member and projecting inwardly of the track member and defining opposite side marginal limits of said path of movement of said idler wheels and abutment surfaces for engagement with the opposite sides of said idler wheels in order to keep said idler wheels centered relative to said path of movement.

3. The combination of claim 2 wherein said axle members of said shaft comprise a support between said longitudinal members whereby said support member may be slightly twisted about its longitudinal axis enabling said endless track member to more readily conform to the contour of its supporting surface.

4. The combination of claim 2 wherein said idler wheels are resilient.

5. The combination of claim 2 wherein the axis of rotation of said drive wheel is spaced laterally to one side of a straight line extending between the axes of rotation of said idler wheels.

6. The combination of claim 5 wherein said drive wheel is enclosed by said endless track member and outwardly deflects one reach thereof.

References Cited in the file of this patent

UNITED STATES PATENTS

| | | |
|---|---|---|
| 526,556 | Bolton | Sept. 25, 1894 |
| 1,068,883 | Frank | July 29, 1913 |
| 1,467,908 | Perrigo | Sept. 11, 1923 |
| 1,631,114 | Anderson | June 7, 1927 |
| 1,786,539 | Kegresse | Dec. 30, 1930 |
| 2,475,250 | Petersen | July 5, 1949 |
| 2,749,189 | France | June 5, 1956 |

FOREIGN PATENTS

| | | |
|---|---|---|
| 482,924 | Canada | May 6, 1952 |